（12） United States Patent
Itagaki

(10) Patent No.: US 10,612,500 B2
(45) Date of Patent: Apr. 7, 2020

(54) INTAKE MANIFOLD

(71) Applicant: HONDA MOTOR CO., LTD., Minato-ku, Tokyo (JP)

(72) Inventor: Keisuke Itagaki, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 0 days.

(21) Appl. No.: 16/017,033

(22) Filed: Jun. 25, 2018

(65) Prior Publication Data

US 2019/0010899 A1 Jan. 10, 2019

(30) Foreign Application Priority Data

Jul. 5, 2017 (JP) ................... 2017-131865

(51) Int. Cl.
*F02M 35/10* (2006.01)
*F02M 35/104* (2006.01)
*F02M 35/16* (2006.01)
*B60K 13/02* (2006.01)
*F02M 55/02* (2006.01)

(52) U.S. Cl.
CPC ........... *F02M 35/104* (2013.01); *B60K 13/02* (2013.01); *F02M 35/10216* (2013.01); *F02M 35/10222* (2013.01); *F02M 35/10288* (2013.01); *F02M 35/161* (2013.01); *F02M 55/025* (2013.01); *B60Y 2306/01* (2013.01); *F02M 2200/185* (2013.01)

(58) Field of Classification Search
CPC ........... F02M 35/10216; F02M 35/104; F02M 2200/185
See application file for complete search history.

(56) References Cited

U.S. PATENT DOCUMENTS 9,926,895 B2 3/2018 Daiki et al.
2004/0159314 A1* 8/2004 Ishizuka ............ F01M 13/0416
123/572

(Continued)

FOREIGN PATENT DOCUMENTS

JP S62169234 U 10/1987
JP 2003035228 A 2/2003

(Continued)

OTHER PUBLICATIONS

Decision to Grant a Patent for JP Application No. 2017-131865, dated Feb. 5, 2019, 3 pages.

*Primary Examiner* — Long T Tran
(74) *Attorney, Agent, or Firm* — Armstrong Teasdale LLP

(57) ABSTRACT

An intake manifold includes: multiple branch pipes having downstream ends fastened to a front or rear surface of a cylinder head; a main pipe connected to upstream ends of the branch pipes; and a cover including a cover main body attached to an upper surface of a portion of at least one of the branch pipes to define a blow-by gas passage, and a protrusion protruding upward from the cover main body, the portion of the at least one of the branch pipes being adjacent to the cylinder head, wherein the protrusion is spaced apart from the cylinder head in a fore and aft direction such that a fuel line positioned above the downstream ends of the branch pipes is interposed between the protrusion and the cylinder head in the fore and aft direction, the protrusion being positioned to overlap a part of the fuel line as seen from front.

7 Claims, 5 Drawing Sheets

(56) References Cited

U.S. PATENT DOCUMENTS

| | | | |
|---|---|---|---|
| 2012/0247415 A1* | 10/2012 | Kim | ................ F02M 35/10216 |
| | | | 123/184.21 |
| 2016/1053409 | 2/2016 | Daiki et al. | |
| 2016/0153409 A1* | 6/2016 | Sudo | ................... F02M 35/104 |
| | | | 123/184.61 |

FOREIGN PATENT DOCUMENTS

| | | |
|---|---|---|
| JP | 2007239710 A | 9/2007 |
| JP | 2013108382 A | 6/2013 |
| JP | 2016-102430 A | 6/2016 |

* cited by examiner

INTAKE MANIFOLD

TECHNICAL FIELD

The present invention relates to an intake manifold of an internal combustion engine.

BACKGROUND ART

JP2016-102430A discloses an internal combustion engine in which an intake manifold is disposed in front of a fuel line to protect the fuel line in case of a vehicle collision. In the internal combustion engine disclosed in this prior art, at the time of vehicle collision, a front part of the intake manifold is deformed to absorb the collision load. On the other hand, a rear part of the intake manifold is not deformed to protect the fuel line.

However, if the load applied at the time of collision is large, the entirety of the intake manifold may be deformed. In such a situation, the deformed intake manifold and a throttle valve or other devices connected to the intake manifold may collide with and cause damage to the fuel line.

SUMMARY OF THE INVENTION

In view of such a prior art problem, a primary object of the present invention is to provide an intake manifold that can reliably protect the fuel line at the time of vehicle collision.

To achieve such an object, one aspect of the present invention provides an intake manifold (8) including: a plurality of branch pipes (12) having downstream ends fastened to a front or rear surface of a cylinder head (3); a main pipe (11) connected to upstream ends of the branch pipes; and a cover (13) including a cover main body (21) attached to an upper surface of a portion of at least one of the branch pipes to define a blow-by gas passage (28), and a protrusion (22) protruding upward from the cover main body, the portion of the at least one of the branch pipes being adjacent to the cylinder head, wherein the protrusion is spaced apart from the cylinder head in a fore and aft direction such that a fuel line (10) positioned above the downstream ends of the branch pipes is interposed between the protrusion and the cylinder head in the fore and aft direction, the protrusion being positioned to overlap a part of the fuel line as seen from front.

According to this arrangement, because the protrusion is provided on the cover main body attached to the portion (downstream portion) of the at least one of the branch pipes adjacent to the cylinder head, even if the intake manifold is deformed at the time of vehicle collision, the relative position between the protrusion and the cylinder head tends not to change significantly. Therefore, if the intake manifold is deformed and the upstream portion (such as the main pipe) of the deformed intake manifold moves toward the cylinder head forward or rearward, the upstream portion of the deformed intake manifold collides with the protrusion. Thus, collision between the upstream portion of the deformed intake manifold and the fuel line can be prevented, and the fuel line can be protected reliably.

Preferably, the protrusion has a slanted surface (33, 34) that is slanted upward toward the cylinder head.

According to this arrangement, the upstream portion of the deformed intake manifold colliding with the protrusion is caused to move upward along the slanted surface, and therefore, the upstream portion of the deformed intake manifold is prevented from colliding with the fuel line more reliably.

Also preferably, the slanted surface is slanted such that the fuel line is positioned below a plane obtained by extrapolating the slanted surface toward the cylinder head.

According to this arrangement, the upstream portion of the deformed intake manifold colliding with the protrusion is caused to move along the slanted surface to above the fuel line, and therefore, the upstream portion of the deformed intake manifold is prevented from colliding with the fuel line even more reliably.

Also preferably, a cross section of the protrusion includes an arched portion that is convex in a direction away from the cylinder head.

According to this arrangement, the stiffness of the protrusion against load applied thereto in the direction toward the cylinder head is improved. Therefore, when the upstream portion of the deformed intake manifold collides with the protrusion, the protrusion does not deform easily.

Also preferably, a base portion of the protrusion is provided with a through-hole (36) extending through the base portion in the fore and aft direction.

According to this arrangement, even if rainwater or the like adheres to the protrusion, the rainwater or the like is discharged through the through-hole, and therefore, corrosion of the protrusion can be prevented.

Also preferably, the upper surfaces of the branch pipes are continuously connected to one another to form a common cover mounting surface (19), a lower surface of the cover main body includes a cover fastening surface (25) configured to abut on the cover mounting surface, and at least one of the cover mounting surface and the cover fastening surface is formed with a groove (27) for defining the blow-by gas passage in communication with an interior of each of the branch pipes.

According to this arrangement, the blow-by gas passage can be formed easily.

Also preferably, each of the branch pipes is curved to be concave downward as seen in side view, the main pipe includes a surge tank (15) connected to the branch pipes and to a throttle valve (7), and the throttle valve is positioned to overlap at least a part of the protrusion as seen from front.

According to this arrangement, the protrusion prevents the throttle valve from colliding with the fuel line in case of vehicle collision, to thereby protect the fuel line.

Effect of the Invention

Thus, according to one aspect of the present invention, an intake manifold that can reliably protect the fuel line at the time of vehicle collision is provided.

DESCRIPTION OF THE PREFERRED EMBODIMENT(S)

In the following, an intake manifold according to an embodiment of the present invention will be described with reference to the drawings. In the embodiment described in the following, the present invention is applied to a vehicle in which an engine room is defined in a front part of the vehicle body. In the following description, the directions such as front, rear, left, and right are defined with respect to the vehicle body.

Figure 1:
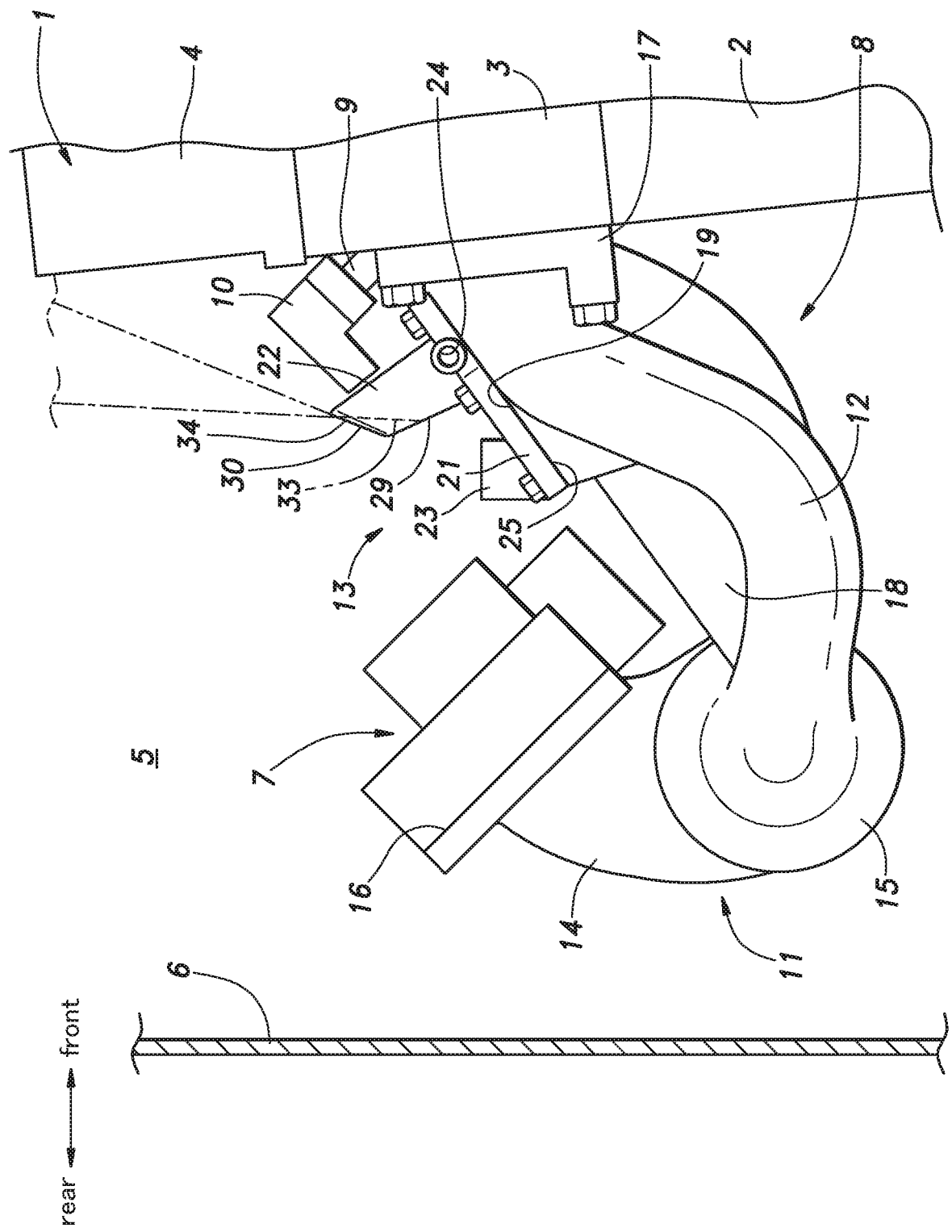
FIG. 1 is a side view of an engine room in which an internal combustion engine including an intake manifold according to an embodiment of the present invention is disposed.

As shown in FIG. 1, an internal combustion engine 1 includes a cylinder block 2 internally defining a plurality of cylinders, a cylinder head 3 mounted on the cylinder block 2, and a head cover 4 mounted on the cylinder head 3. The internal combustion engine 1 is mounted transversely in an engine room 5 such that the cylinders are arranged substantially in a vehicle width direction, and an exhaust side faces forward while an intake side faces rearward. The internal combustion engine 1 is mounted on the vehicle body so as to be inclined rearward. Behind the internal combustion engine 1, a dashboard 6 is provided to partition the engine room 5 from a passenger compartment.

Though not shown in the drawings, a lower surface of the cylinder head 3 is provided with combustion chamber recesses that define combustion chambers in cooperation with the cylinders. The cylinder head 3 is formed with intake ports extending rearward from the corresponding combustion chamber recesses and opening out in the rear surface of the cylinder head 3 and exhaust ports extending forward from the corresponding combustion chamber recesses and opening out in the front surface of the cylinder head 3.

An intake system for supplying the combustion chambers with intake air is mounted to the rear surface of the cylinder head 3. The intake system includes, from an upstream side thereof, an air inlet, an air cleaner, a supercharger, an intercooler, a throttle valve 7, and an intake manifold 8 in this order, and is connected to each of the intake ports at the intake manifold 8. Of these component parts of the intake system, the throttle valve 7 and the intake manifold 8 are illustrated in FIG. 1.

An exhaust system for discharging exhaust gas from the combustion chambers is mounted to the front surface of the cylinder head 3. The exhaust system includes, from an upstream side thereof, an exhaust manifold, a three way catalyst, and a silencer, and is connected to each of the exhaust ports at the exhaust manifold. Such an exhaust system is conventional and not shown in the drawings.

The internal combustion engine 1 includes a fuel tank, a fuel pump for pumping the fuel in the fuel tank, a fuel line for transferring the fuel, and injectors 9 connected to the fuel line and configured to inject fuel into the corresponding intake ports. Of these components, one of the injectors 9 is shown in FIG. 1. Each injector 9 is inserted from above into the corresponding intake port provided in the rear surface of the cylinder head 3, and projects into the intake port. The fuel line includes, at a downstream end thereof, a delivery pipe 10 for distributing the fuel to the injectors 9. The delivery pipe 10 is arranged to extend linearly in a lateral direction above the intake ports, and is connected to each of the injectors 9 mounted on the cylinder head 3.

Figure 2:
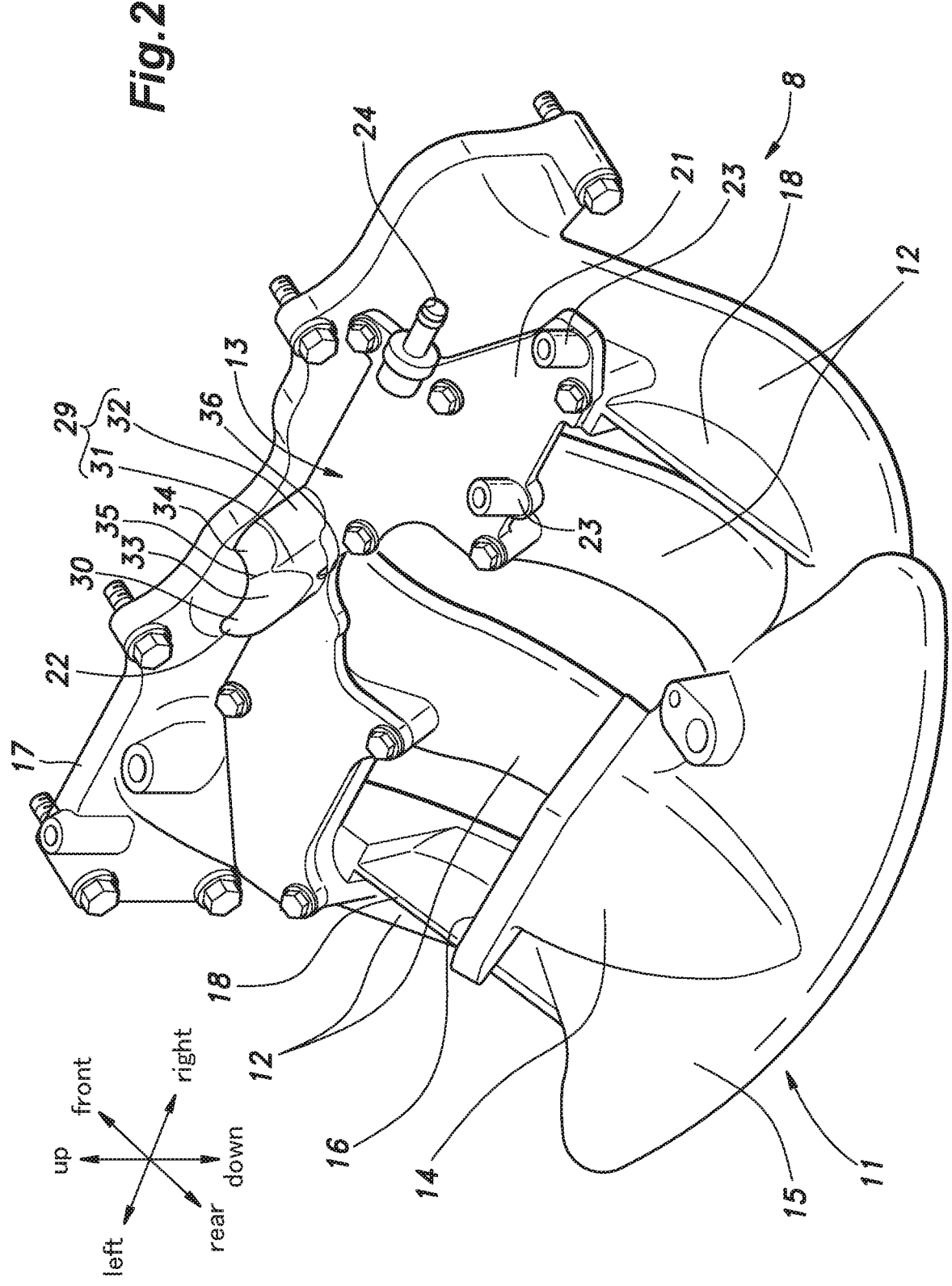
FIG. 2 is a perspective view of the intake manifold.

With additional reference to FIG. 2, the intake manifold 8 includes, from an upstream side thereof, a main pipe 11, a plurality of branch pipes 12 extending from the main pipe 11, and a cover 13 attached to upper surfaces of downstream portions of the branch pipes 12 (or portions of the branch pipes 12 adjacent to the cylinder head 3). In the present embodiment, the intake manifold 8 includes four branch pipes 12.

As shown in FIG. 2, the main pipe 11 includes, from an upstream side thereof, a connecting pipe 14, and a surge tank 15 joined to the connecting pipe 14. The surge tank 15 has a substantially spheroidal shape that is elongated laterally, and internally defines a chamber for maintaining a steady flow of the intake air. As shown in FIG. 1, the surge tank 15 is positioned between the dashboard 6 and the cylinder block 2 so as to be spaced from each of the dashboard 6 and the cylinder block 2. The connecting pipe 14 is connected to an upper surface of the surge tank 15, and extends upward. An upper end of the connecting pipe 14 is provided with a flange forming a valve mounting surface 16 that is slanted downward toward the front. The throttle valve 7 is fastened to the valve mounting surface 16, and thereby is connected to the connecting pipe 14. Thus, the surge tank 15 is connected to the throttle valve 7 via the connecting pipe 14.

Upstream ends of the branch pipes 12A are connected to a front surface of the surge tank 15. Each branch pipe 12 extends from the surge tank 15 forward and slightly downward, and then is bent to extend obliquely upward to the rear surface of the cylinder head 3, and as a result, has a curved shape that is convex downward as seen in side view. Downward ends of the branch pipes 12 are connected together by a common fastening flange 17. The fastening flange 17 is fastened to the rear surface of the cylinder head 3, whereby the intake manifold 8 is mounted on the cylinder head 3. As shown in FIG. 2, two of the branch pipes 12 positioned at lateral ends are each formed with a rib 18 that extends on the upper surface of the branch pipe 12 in a fore and aft direction.

The upper surfaces of the portions of the branch pipes 12 adjacent to the cylinder head 3 are continuously connected to one another to form a common cover mounting surface 19. In the illustrated embodiment, the upper surfaces of all of the four branch pipes 12 are connected continuously to form the cover mounting surface 19. As shown in FIG. 1, the cover mounting surface 19 is slanted upward toward the front in the state where the intake manifold 8 is mounted on the cylinder head 3. Each branch pipe 12 is formed with a branch pipe-side passage 20 (see FIG. 3) that extends from the cover mounting surface 19 to inside of the branch pipe 12.

As shown in FIG. 2, the cover 13 includes a plate-shaped cover main body 21 and a protrusion 22 that projects from an upper surface of the cover main body 21. The cover main body 21 is elongated laterally and has portions protruding rearward at both lateral ends thereof. The upper surface of the cover main body 21 is formed with a plurality of bosses 23 for mounting a prescribed member thereon.

The cover main body 21 is formed with a blow-by gas inlet 24 from which the blow-by gas is introduced. The blow-by gas inlet 24 is connected to the crankcase chamber defined in a lower part of the cylinder block 2 via a pipe or the like (not shown in the drawings). Though not shown in the drawings, appropriate devices, such as an oil separator for separating oil contained in the blow-by gas and a positive crankcase ventilation (PCV) valve for regulating the flow rate of the blow-by gas, are preferably provided between the crankcase chamber and the blow-by gas inlet 24.

Figure 3:
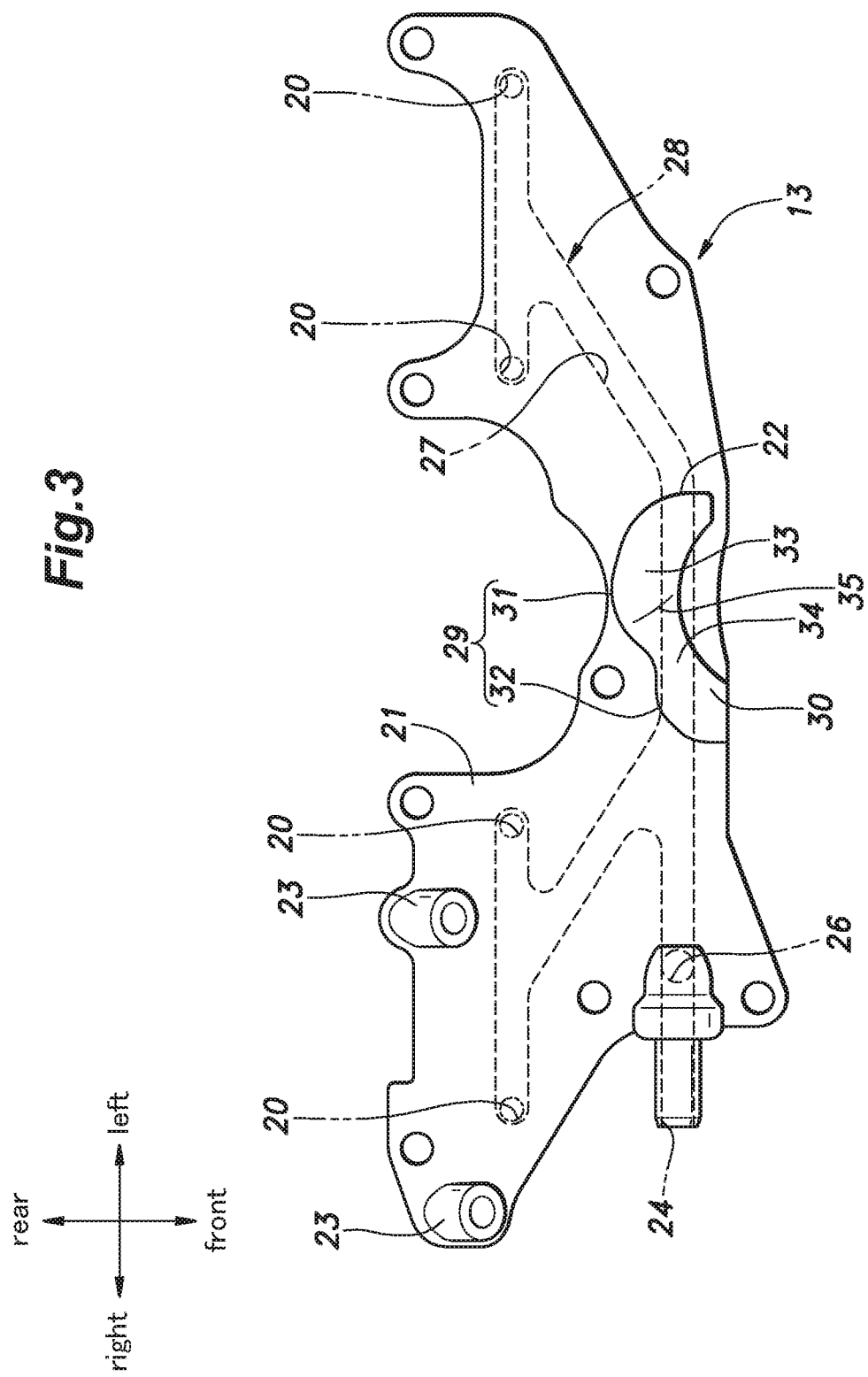
FIG. 3 is a top view of a cover configured to be fastened to branch pipes of the intake manifold to form a blow-by gas passage.
Figure 4:
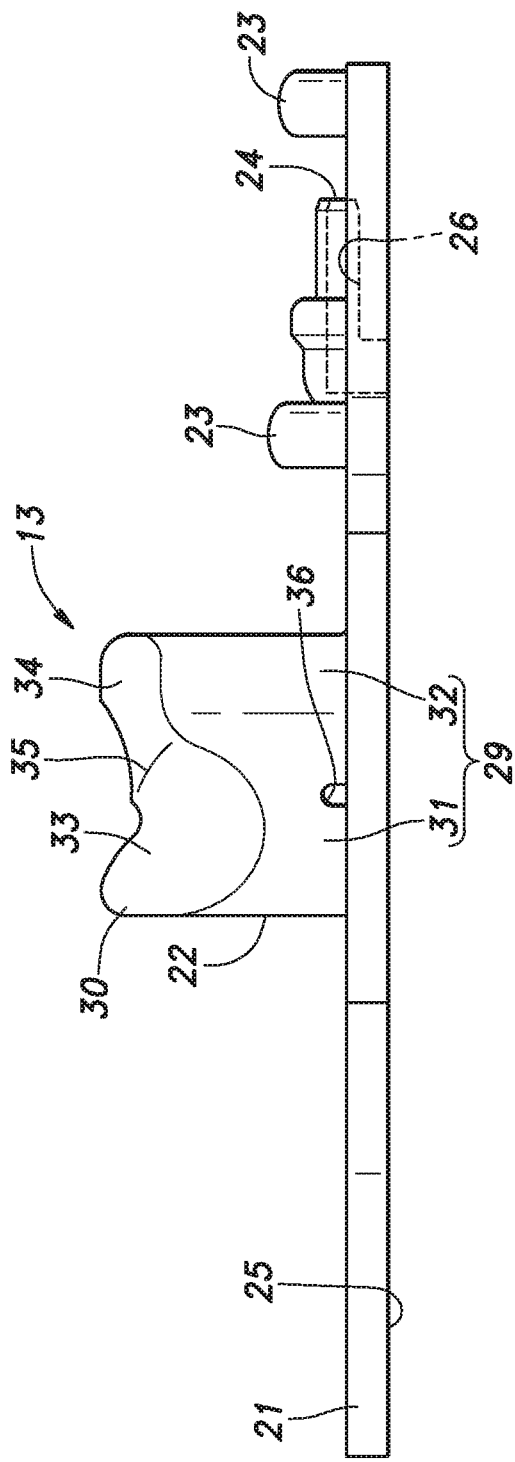
FIG. 4 is a rear view of the cover.

The lower surface of the cover main body 21 defines a cover fastening surface 25. The cover main body 21 is fastened to the branch pipes 12, with the cover fastening surface 25 of the cover main body 21 and the cover mounting surface 19 formed on the upper surfaces of the branch pipes 12 abutting on each other. As shown in FIG. 4, the cover 13 is provided with a cover-side passage 26 extending from the blow-by gas inlet 24 to the cover fastening surface 25. As shown in FIG. 3, the lower surface of the cover main body 21 is formed with a cover groove 27 to connect the cover-side passage 26 with the branch pipe-side passages 20. The cover-side passage 26, the cover groove 27, and the branch pipe-side passages 20 jointly define a blow-by gas passage 28 for distributing the blow-by gas to the branch pipes 12. To distribute the blow-by gas to the branch pipes 12 substantially evenly, the cover groove 27 branches to have a shape like a tournament tree.

As shown in FIG. 1, the protrusion 22 has a side wall 29 protruding from the cover main body 21 and an upper wall 30 provided at a projecting end of the side wall 29.

The side wall 29 is plate-shaped and protrudes from a laterally central part of the cover main body 21 substantially perpendicularly to the cover main body 21. As shown in FIG. 3, the side wall 29 includes a first side wall 31 constituting a left part of the side wall 29 and a second side wall 32 constituting a right part of the side wall 29. A right edge of the first side wall 31 is continuously connected with a left edge of the second side wall 32. The first side wall 31 has a cross section (a section taken in a plane perpendicular to the protruding direction of the protrusion 22) arched to be convex rearward. The second side wall 32 has a cross section arched to be convex in a right rear direction. The first side wall 31 projects more gently compared to the second side wall 32. The rearward protruding end of the first side wall 31 is positioned more rearward than the second side wall 32. The left edge of the first side wall 31 and the right edge of the second side wall 32 each extend in the fore and aft direction as seen in FIG. 3.

Figure 5:
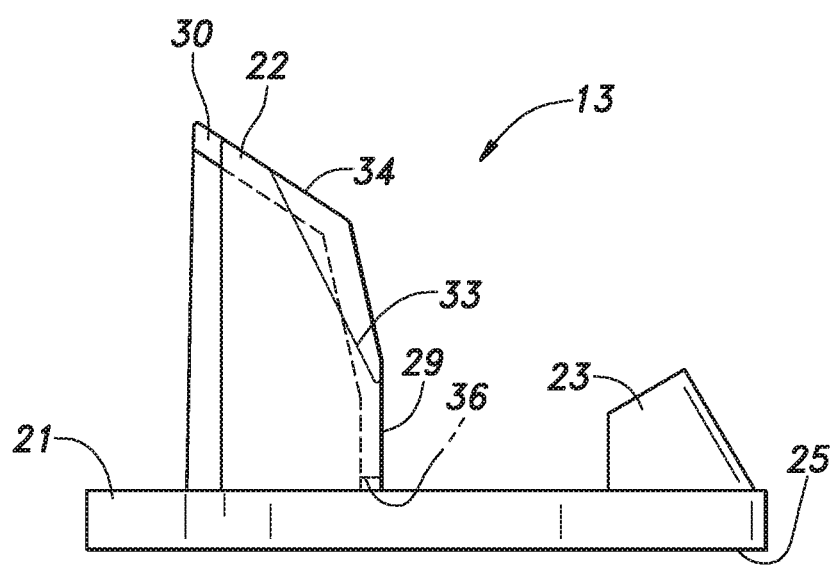
FIG. 5 is a side view of the cover.

The upper wall 30 is connected to the upper ends of the first side wall 31 and the second side wall 32 to define a first slanted surface 33 above the first side wall 31 and a second slanted surface 34 above the second side wall 32. As seen in FIG. 1, the first slanted surface 33 and the second slanted surface 34 are slanted such that each is inclined forward relative to the vertical direction in the state where the cover 13 is attached to the cover mounting surface 19 of the branch pipes 12. As can be appreciated from FIG. 5, an angle defined between the first slanted surface 33 and the principal surface of the cover main body 21 is larger than an angle defined between the second slanted surface 34 and the principal surface of the cover main body 21. As shown in FIG. 4, a ridge line 35 is formed between the first slanted surface 33 and the second slanted surface 34. The ridge line 35 increases the stiffness of the upper wall 30. As shown in FIG. 1, in the state where the cover 13 is attached to the cover mounting surface 19 of the branch pipes 12, a plane obtained by extrapolating the first slanted surface 33 forward (shown by a one-dot chain line) and a plane obtained by extrapolating the second slanted surface 34 forward (shown by a two-dot chain line) both pass above the delivery pipe 10.

As shown in FIG. 4, a base portion of the first side wall 31 is provided with a through-hole 36 extending through the base portion in the fore and aft direction. Namely, the through-hole 36 is provided in an end portion of the first side wall 31 adjacent to the cover main body 21. The through-hole 36 is inclined downward toward the rear when the cover 13 is attached to the cover mounting surface of the branch pipes 12.

The first side wall 31 and the second side wall 32 are located at a laterally central part between the second and third branch pipes 12 from the left. As shown in FIG. 1, the first side wall 31 and the second side wall 32 are positioned behind the injectors 9 and the delivery pipe 10 as seen in side view. Namely, the delivery pipe 10 is interposed between the protrusion 22 and the cylinder head 3 in the fore and aft direction. In addition, as can be appreciated from FIG. 2 (particularly, the position of the valve mounting surface 16 to which the throttle valve 7 is to be mounted), the first side wall 31 and the second side wall 32 (protrusion 22) are positioned to overlap at least a part of the throttle valve 7 as seen from the front. Further, as the delivery pipe 10 extends laterally to be connected with each of the injectors 9, the protrusion 22 also overlaps with a part of the delivery pipe 10 (fuel line) as seen from the front.

In the following, the features and advantages of the intake manifold 8 configured as described above will be described. At the time of forward collision, the internal combustion engine 1 moves rearward, and the intake manifold 8 may collide with the dashboard 6. If the intake manifold 8 collides with the dashboard 6, a load is applied on the branch pipes 12 of the intake manifold 8, and this may deform the branch pipes 12.

When the branch pipes 12 deform, the branch pipes 12 tend to deform greatly at a central portion thereof with respect to the fore and aft direction. Particularly, because the branch pipes 12 are formed to be curved downwardly at the central portion with respect to the fore and aft direction, the branch pipes 12 tend to deform relatively easily at the curved portions. In the illustrated embodiment, the cover main body 21 is secured to the portions of the branch pipes 12 adjacent to the cylinder head 3, namely, to the portions of the branch pipes 12 close to the downstream ends fastened to the cylinder head 3, and therefore, even when the branch pipes 12 undergo deformation, the position of the cover main body 21 relative to the cylinder head 3 tends not to change significantly. Therefore, even when the branch pipes 12 undergo deformation, the position of the protrusion 22 protruding from the cover main body 21 relative to the delivery pipe 10, which is connected to the injectors 9 mounted to the cylinder head 3, tends not to change significantly. Further, the fastening of the cover main body 21 to the portions of the branch pipes 12 adjacent to the cylinder head 3 increases the stiffness of the portions of the branch pipes 12 adjacent to the cylinder head 3. Thereby, even when the branch pipes 12 undergo deformation, the portions of the branch pipes 12 adjacent to the cylinder head 3 do not deform significantly, and this also contributes to preventing movement of the protrusion 22 relative to the delivery pipe 10.

When the branch pipes 12 are deformed in the case of vehicle collision or the like, the main pipe 11 connected to the upstream ends of the deformed branch pipes 12 and the throttle valve 7 attached to the main pipe 11 are caused to move toward the cylinder head 3, the position of the protrusion 22 relative to the delivery pipe 10 does not change significantly. As a result, the main pipe 11 and the throttle valve 7 collide with the protrusion 22, and are prevented from reaching the delivery pipe 10. Thereby, the delivery pipe 10 is protected.

In some cases, the deformation of the branch pipes 12 may cause the throttle valve 7 to move horizontally toward the cylinder head 3. In the illustrated embodiment, the first side wall 31 and the second side wall 32 are positioned to overlap at least a part of the throttle valve 7 as seen from the front, and therefore, the horizontally moving throttle valve 7 collides with the first side wall 31 and the second side wall 32. The first side wall 31 and the second side wall 32 each have a cross section arched to be convex in a direction away from the cylinder head 3 (rearward), and hence, have high stiffness against the load from the rear. Therefore, when the throttle valve 7 collides with the first side wall 31 and the second side wall 32, the first side wall 31 and the second side wall 32 do not deform significantly, and prevent the throttle valve 7 from colliding with the delivery pipe 10.

When the main pipe 11 connected to the upstream ends of the deformed branch pipes 12 (or intake manifold 8) and the throttle valve 7 attached to the main pipe 11 move toward the cylinder head 3 and collide with the protrusion 22, the main pipe 11 and the throttle valve 7 move along the first slanted surface 33 or the second slanted surface 34 formed on the protrusion 22 to above the delivery pipe 10. This also contributes to preventing the main pipe 11 (or upstream portion of the deformed intake manifold 8) and the throttle valve 7 from colliding with the delivery pipe 10. The provision of the ridge line 35 increases the stiffness of the upper wall 30 of the protrusion 22, and therefore, the upper wall 30 does not deform easily when the upstream portion of the intake manifold 8 and the throttle valve 7 move along the first slanted surface 33 or the second slanted surface 34.

The protrusion 22 is formed with the through-hole 36. Therefore, if rainwater or the like adheres to the front surface of the protrusion 22, the rainwater or the like is discharged through the through-hole 36. This prevents corrosion of the protrusion 22 due to the rainwater or the like. In the state where the cover 13 has been mounted, the through-hole 36 is inclined downward, the rainwater or the like can be readily discharged. In addition, because the through-hole 36 is formed in the base end portion of the protrusion 22, even the rainwater or the like trapped in the corner between the cover main body 21 and the protrusion 22 can be readily discharged.

In the above embodiment, because the blow-by gas passage 28 is formed by simply fastening the cover 13 to the cover mounting surface 19, the formation of the blow-by gas passage 28 is easy.

The concrete embodiment of the present invention has been described in the foregoing, but the present invention is not limited to the embodiment and may be modified in various ways. For example, in the above embodiment, the present invention was exemplarily applied the intake manifold 8 fastened to the rear surface of the cylinder head 3, but the intake manifold 8 may be fastened to the front or rear surface of the cylinder head 3, and the present invention may be applied to the intake manifold 8 fastened to the front surface of the cylinder head 3. In such a case, the internal combustion engine 1 is mounted such that the exhaust side faces rearward and the intake side faces forward.

In the foregoing embodiment, the upper surfaces of the downstream portions of all of the branch pipes 12 are continuously connected to one another to form the common cover mounting surface 19, but the cover mounting surface 19 may be formed by the upper surface of the downstream portion of at least one of the branch pipes 12. For example, the cover mounting surface 19 may be formed by the upper surface of the downstream portions of the central two branch pipes 12, such that the cover 13 is fastened to the upper surfaces of the central two branch pipes 12. Also, instead of the cover groove 27 formed in the cover fastening surface 25, a groove may be formed in the cover mounting surface 19 to constitute the blow-by gas passage 28.

In the foregoing embodiment, the throttle valve 7 and the surge tank 15 were positioned behind the cylinder head 3, but the positions of the throttle valve 7 and the surge tank 15 are not limited to those shown in the embodiment. The throttle valve 7 and the surge tank 15 may be vertically positioned to be above the fuel line (delivery pipe 10). Such an arrangement contributes to preventing the throttle valve 7 and the surge tank 15 from colliding with the fuel line (delivery pipe 10) if the intake manifold 8 (particularly, the branch pipes 12) deforms at the time of vehicle collision.

In the foregoing embodiment, the present invention was exemplarily applied to a vehicle in which the internal combustion engine 1 was mounted in the front part of the vehicle body, but the present invention may be applied to a vehicle in which the internal combustion engine 1 is mounted in a rear part of the vehicle body. Besides, the concrete structure, position, number, angle, etc. of each member or part may be changed as appropriate within the scope of the present invention. Not all of the structural elements of the intake manifold 8 shown in the above embodiment are necessarily indispensable and they may be selectively used as appropriate.

The invention claimed is:

1. An intake manifold, comprising:
    a plurality of branch pipes having downstream ends fastened to a front or rear surface of a cylinder head;
    a main pipe connected to upstream ends of the branch pipes; and
    a cover including a cover main body attached to an upper surface of a portion of at least one of the branch pipes to define a blow-by gas passage, and a protrusion protruding upward from the cover main body, the portion of the at least one of the branch pipes being adjacent to the cylinder head,
    wherein the protrusion has a side wall and an upper wall, the upper wall defining a first slanted surface and second slanted surface both slanted upward toward the cylinder head, and jointly forming a ridge line between the first slanted surface and the second slanted surface, and the protrusion is spaced apart from the cylinder head in a fore and aft direction such that a fuel line positioned above the downstream ends of the branch pipes is interposed between the protrusion and the cylinder head in the fore and aft direction, the protrusion being positioned to overlap a part of the fuel line as seen from a front of the vehicle body.

2. The intake manifold as defined in claim 1, wherein each of the first slanted surface and the second slanted surface is slanted such that the fuel line is positioned below respective planes obtained by extrapolating the first slanted surface and the second slanted surface toward the cylinder head.

3. The intake manifold as defined in claim 1, wherein a cross section of the protrusion includes an arched portion that is convex in a direction away from the cylinder head.

4. The intake manifold as defined in claim 1, wherein a base portion of the protrusion is provided with a through-hole extending through the base portion in the fore and aft direction.

5. The intake manifold as defined in claim 1, wherein
    the upper surfaces of the branch pipes are continuously connected to one another to form a common cover mounting surface,
    a lower surface of the cover main body includes a cover fastening surface configured to abut on the cover mounting surface, and
    at least one of the cover mounting surface and the cover fastening surface is formed with a groove for defining the blow-by gas passage in communication with an interior of each of the branch pipes.

6. The intake manifold as defined in claim 1, wherein each of the branch pipes is curved to be concave downward as seen in side view, the main pipe includes a surge tank connected to the branch pipes and to a throttle valve, and the throttle valve is positioned to overlap at least a part of the protrusion as seen from the front of the vehicle body.

7. The intake manifold as defined in claim 1, wherein the cover is attached to a cover mounting surface defined by upper surfaces of portions of the branch pipes adjacent to the cylinder head, and extending obliquely upward to the rear surface of the cylinder head.

* * * * *